(12) United States Patent  (10) Patent No.: US 6,705,472 B2
Cross et al.  (45) Date of Patent: Mar. 16, 2004

(54) CD STORAGE SYSTEM

(76) Inventors: David Webster Cross, 26 Ravelston Road, Bearsden Glasgow (GB), G61 1AW; Elaine Mary Cross, 26 Ravelston Road, Bearsden Glasgow (GB), G61 1AW ( * ) Notice: Subject to any disclaimer, the term of this patent is extended or adjusted under 35 U.S.C. 154(b) by 62 days.

(21) Appl. No.: 10/045,506

(22) Filed: Nov. 7, 2001

(65) Prior Publication Data

US 2002/0060196 A1 May 23, 2002

(30) Foreign Application Priority Data

May 8, 2000 (WO) .............................. PCT/GB00/01760

(51) Int. Cl.[7] .................................................. A47F 7/00
(52) U.S. Cl. ..................... 211/40; 211/41.12; 211/175; 211/126.2; D6/407
(58) Field of Search ................................ 211/40, 41.12, 211/175, 11, 126.2, 59.3, 59.2; 312/9.9; D6/407; 206/308.1

(56) References Cited

U.S. PATENT DOCUMENTS

| 3,635,350 | A |   | 1/1972  | Wolf |
| 4,724,968 | A | * | 2/1988  | Wombacher ............... 211/59.3 |
| 5,160,027 | A | * | 11/1992 | Wu |
| 5,184,722 | A |   | 2/1993  | Shin et al. |
| 5,267,659 | A |   | 12/1993 | Fickling et al. |
| 5,495,953 | A | * | 3/1996  | Bearth .......................... 211/40 |
| 5,645,329 | A |   | 7/1997  | Madock |
| 5,685,439 | A | * | 11/1997 | Luenser .................... 211/40 X |
| 6,112,910 | A | * | 9/2000  | Baxter .......................... 211/40 |
| 6,179,121 | B1 | * | 1/2001 | Ferguson et al. ..... 206/308.1 X |
| 6,188,032 | B1 | * | 2/2001 | Hartman .................. 206/308.1 |

* cited by examiner

Primary Examiner—Robert W. Gibson, Jr.
(74) Attorney, Agent, or Firm—Blackwell Sanders Peper Martin, LLP

(57) ABSTRACT

A storage apparatus for the storage of a collection of data media in the form of compact discs, CD-ROMs or DVD discs or the like in their original cases, comprising a number of individual box-like holders which can be releasably attached to each other so that the system can be simply expanded to accommodate more compact discs, CD-ROMs or DVD discs in their original cases at any desired location within the storage system. Each holder comprises a base and first and second opposing vertical side walls which hold a CD case or other case between the side walls. Each holder is provided with first and second fastening means at first and second sides respectively of the holder, adapted to permit the releasable engagement of the first fastening means of one holder with the second fastening means of an adjacent holder. The fastening means may comprise interengaging projecting portions and apertures arranged between the projecting portions, or interengaging fit male and female members. The holders may be slidably mounted on rails.

2 Claims, 7 Drawing Sheets

CD STORAGE SYSTEM

APPLICATION CROSS-REFERENCES

This application claims priority of International Application No. PCT/GB00/01760 filed May 8, 2000 and published in English. This application also claims priority of Great Britain Patent No. 9910459.8, filed May 7, 1999 and Great Britain Patent No. 9928024.0, filed Nov. 27, 1999.

TECHNICAL FIELD

This invention relates to a storage system for the storage of a collection of items, such as compact discs (CDs), CD-ROMs and DVD discs or other data discs or tapes in their original cases. In particular the invention relates to a storage system which comprises a number of modules which can be releasably attached to each other so that the system can be simply expanded to accommodate more compact discs, CD-ROMs and DVD discs in their original cases at any desired location within the storage system.

BACKGROUND OF THE INVENTION

In this field a large number of shelf units, cabinets, stands and trays are already available and have been specifically designed to appropriate dimensions to hold and store CDs and CD-ROMs. They range in capacity from small trays for 10 or 12 CDs to large cabinets with the capacity to hold hundreds of discs. These are generally manufactured in wood, metal or plastic and incorporate slots to hold individual CD cases neatly in place. U.S. Pat. No. 5,645,329, which issued to Madock on Jul. 8, 1997, discloses a modular CD case holder of this sort.

The known shelving systems suffer from the disadvantage that when a collection grows in quantity such that it necessitates filing in a specific sequence in order to facilitate ease of retrieval (commonly in alphabetical order) there is no facility for inserting additions to the collection in the correct position without in turn moving the rest of the collection along slot by slot. For example, if a collection of 100 discs is arranged alphabetically to fill the first 100 adjacent slots in a shelving system, then if a new disc beginning with the letter "C" is added to the collection, it may be necessary to move each one of 80 or more discs to the next adjacent slot in order to create an empty slot in the correct position for the new disc.

The present invention is directed to overcoming one or more of the problems set forth above.

SUMMARY OF THE INVENTION

It is an object of the present invention to provide a storage system for a collection of items which allows expansion of the system at the ends of the storage system or at intermediate locations within the storage system to accommodate the addition of items to the collection at any required position within the collection.

According to a first aspect of the present invention there is provided a storage apparatus for the vertical storage of compact disc cases or other data media cases including a plurality of box-like holders, each holder including a base, which in use is substantially horizontal, and first and second opposing side walls, which in use are substantially vertical, the side walls each having an inner face and an outer face and being adapted to hold a case in a vertical position in a clearance fit between the respective inner faces of the first and second opposing side walls, wherein each holder is provided with first and second fastening means adjacent to the first and second walls respectively, adapted to permit the releasable engagement of the first fastening means of one holder with the second fastening means of an adjacent holder.

Preferably the first and second fastening means are mutually engageable snap fit elements.

Preferably the first fastening means is a male fastener and the second fastening means is a female fastener.

According to a first preferred embodiment the first fastening means includes a resilient tongue member extending along the length of the first side wall from the front of the holder to the rear of the holder, and the second fastening means includes a groove member extending along the length of the second side wall from the front of the holder to the rear of the holder. Preferably the first and second fastening means are adapted to permit mutual separation by a peeling action.

Preferably each holder includes a rear wall extending between the first and second side walls, and wherein the front of the holder is open.

According to a second preferred embodiment the first and second fastening means each comprise a plurality of projecting portions and a plurality of apertures disposed between the projecting portions. Preferably the projecting portions comprise vertically extending ribs and the apertures comprise vertically extending slots adapted to engage with the vertically extending ribs of an adjacent holder, and wherein each projecting portion on the first side wall has a corresponding aperture on the second side wall directly opposite, and each projecting portion on the second side wall has a corresponding aperture on the first side wall directly opposite.

Preferably at least one of the projecting portions is shaped to provide a resilient snap fit connection with the corresponding aperture of an adjacent holder.

Preferably the apparatus includes one or more track members adapted to support the holders, each holder being provided with engagement means beneath the base adapted to releasably engage with said track members. Preferably the track members comprise rail members and the engagement means includes recesses formed in resilient material and adapted to releasably snap fit onto the rail members or otherwise engage with the rail members.

According to a third preferred embodiment the first fastening means includes a horizontally extending lug provided on the first side of the base and the second fastening means includes a corresponding cut-out provided on the second side of the base.

Preferably the first side wall is discontinuous and is adapted to engage with the second side wall of an adjacent holder when the first and second fastening means are mutually engaged, such that the inner and outer faces of the first side wall are coplanar with the outer and inner faces respectively of the second side wall of the adjacent holder.

Each holder may be formed of resilient plastic or rubber material.

According to a second aspect of the present invention there is provided a holder for use in a storage apparatus according to the first aspect of the invention, including a base, which in use is substantially horizontal, and first and second opposing side walls, which in use are substantially vertical, the side walls each having an inner face and an outer face and being adapted to hold a compact disc case or other data media case in a vertical position in a clearance fit between the respective inner faces of the first and second opposing side walls, wherein the holder is provided with first and second fastening means adjacent to the first and second walls respectively, adapted to permit the releasable engagement of the first fastening means of one holder with the second fastening means of an adjacent identical holder.

Preferably each holder includes a rear wall extending between the first and second side walls. Preferably the front of the holder is open.

Preferably each holder is formed of resilient plastic or rubber material. Preferably each holder has a width between the opposing side walls corresponding to the external width of a CD case, a CD-ROM case, a DVD case or other data media case. The side walls of each holder may project below the base to form a downward facing hollow box portion beneath the base. The rail engagement recesses may be formed in the downward projecting part of the side walls. Each holder may be provided with a front face projecting below the base and forming a front wall of the downward facing hollow box portion. The front face may be adapted to receive a label or similar.

Preferably the rail members are of metal.

BRIEF DESCRIPTION OF THE DRAWINGS

A specific embodiment of the invention will now be described by way of example with reference to the accompanying drawings in which.

DETAILED DESCRIPTION OF THE INVENTION

Figure 1:
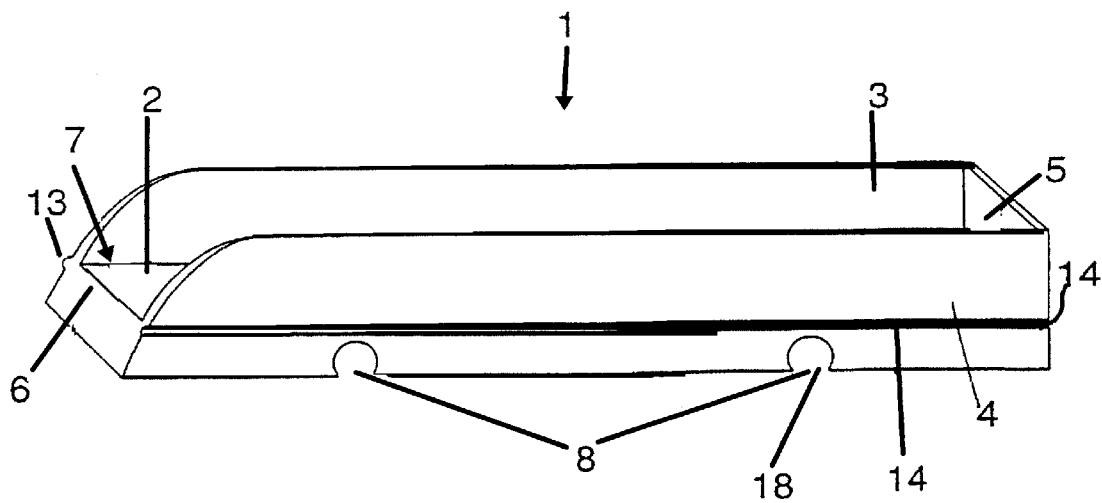
FIG. 1 shows a perspective view of an individual CD case holder according to a first embodiment of the invention.
Figure 2:
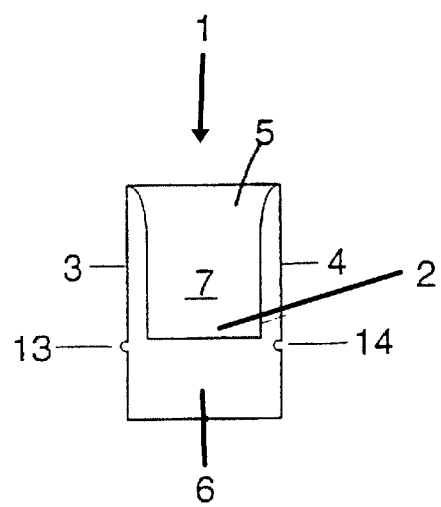
FIG. 2 shows a front view of the individual CD case holder of FIG. 1.
Figure 3:
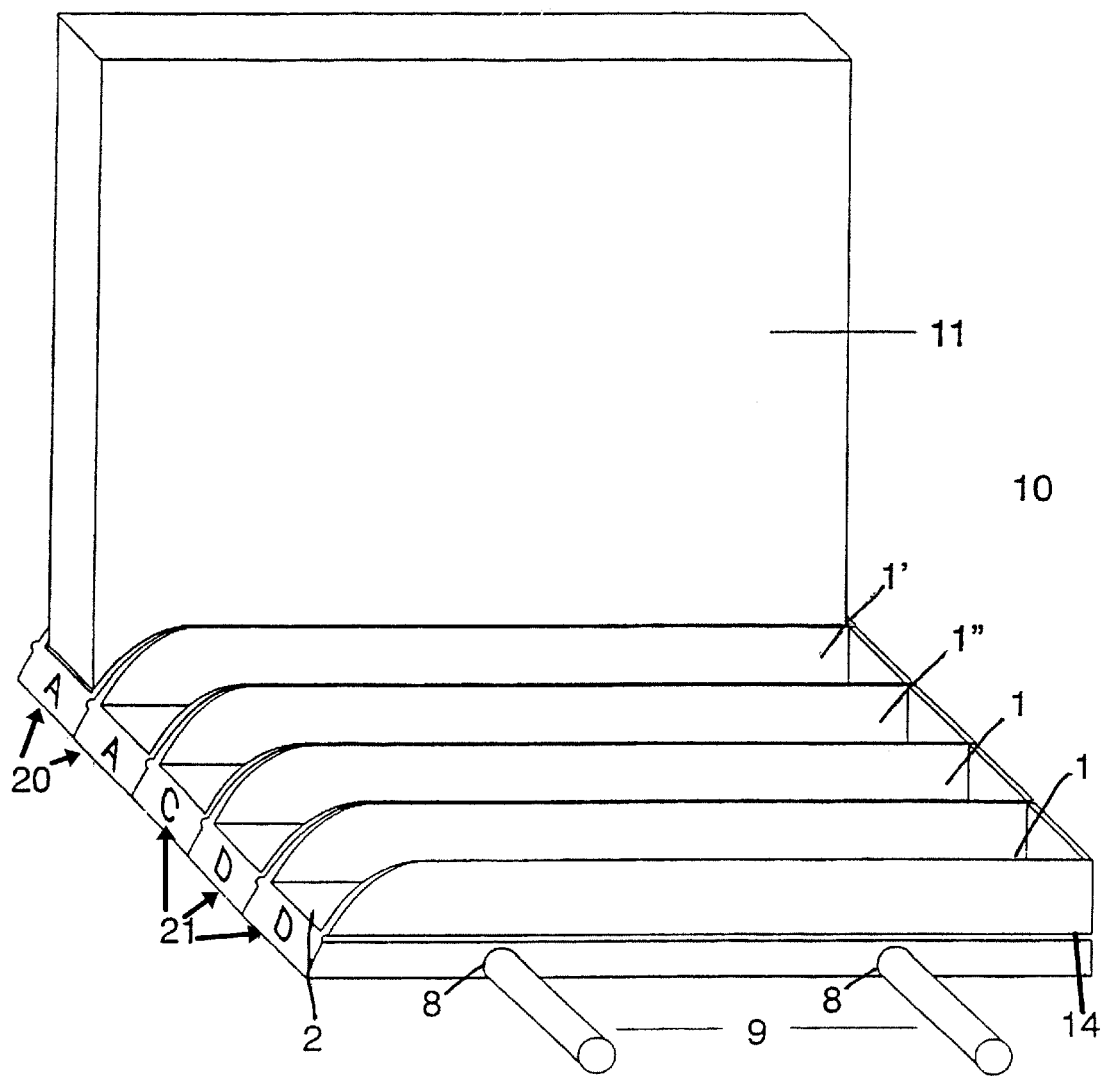
FIG. 3 shows a perspective view of a storage system including multiple CD case holders according to the first embodiment of the invention connected to form a CD storage rack mounted on rod track system.
Figure 4:
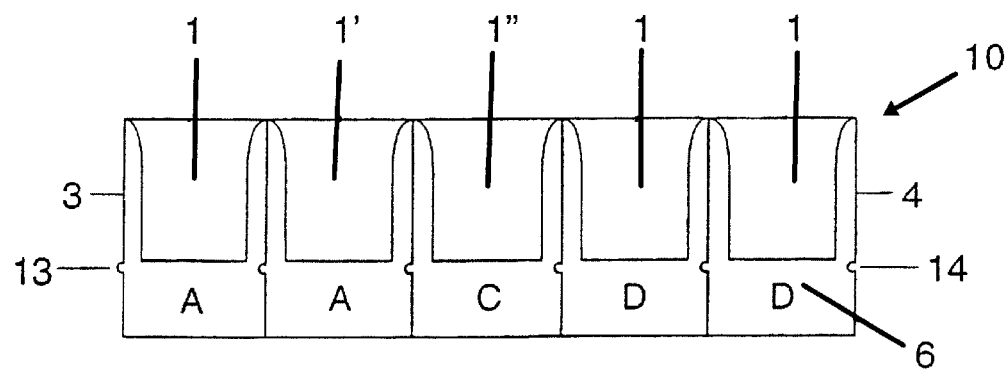
FIG. 4 shows a front view of the storage system of FIG. 3.

Referring to the drawings, FIGS. 1 and 2 illustrate an individual CD holder 1 according to a first embodiment of the invention and FIGS. 3 and 4 show how the individual holders 1 are connected together to form a storage system 10. FIG. 3 shows a holder holding a standard CD case 11. The individual holders 1 are formed in a plastic or rubber material and comprise a floor or base 2, a first side wall 3, a second side wall 4 and an end wall 5. A front wall 6 extends below the base 2 only, so that a case 11 may be slid in and out through the open front 7.

The first side 3 has a male inter-connecting element 13 which can be slotted into a female element 14 on the second side 4 of an adjacent holder in a snap fit connection, so that when two or more of the holders 1 are placed side by side the application of slight pressure forces the holders to join together forming a continuous rack 10, as seen in FIG. 3. Two holders 1 can be separated by means of exerting slight pressure to peel them apart or by sliding one of the holders forward to release it. This allows for the insertion of a new holder 1 between two existing holders.

The downwardly extending portions of the side walls 3, 4 are each provided with two slots 8 to allow the holders to be clipped on to two lightweight metal rod tracks 9, whose ends are held in a support unit (not shown) provided at each end of the rods 9. The slots 8 have a narrower neck portion 18 and the walls 3, 4 are resilient, so that the slots 8 positively locate on the rods 9.

Instead of using rods 9, the system 10 may be placed on any flat shelf or desktop as a free standing unit. For this reason the bottom edges of the side walls 3, 4, rear wall 5 and front wall 6 all lie in a common horizontal plane.

The holders 1 may be formed of any suitable material. It has been found that resilient plastic is the most appropriate material. However natural or artificial rubber may be used. A rigid material such as plastic, steel or wood may be used with other forms of fasteners, for example press studs, Velcro (RTM), rigid interlocking connections, hooked flanges etc.

The holders 1 may be provided in various colors, which may be used as codes to identify the items stored in them. The front walls 6 may be coated with a suitable material to allow the user to write a title on. Alternatively adhesive stickers may be placed on the front wall to identify the items.

In use two adjacent holders may be peeled apart so that a new holder 1 may be inserted in the system 10. In FIG. 3, if a new holder with reference "B" is required to be inserted between the holders referenced "A" and "C", then holders 1' and 1" are peeled apart, and the two blocks of holders 20, 21 are slid apart from each other along the rails. The new holder is lowered onto the rails until the slots 8 engage with the rails 9. The new holder is then slid along the rails and snapped together with holder 1', so that the male connector 13 of the new holder engages with the female connector 14 of holder 1'. The block of holders 21 is then slid along the rails until holder 1" is snapped together with the new holder, so that the male connector 13 of holder 1" engages with the female connector 14 of the new holder.

Figure 5:
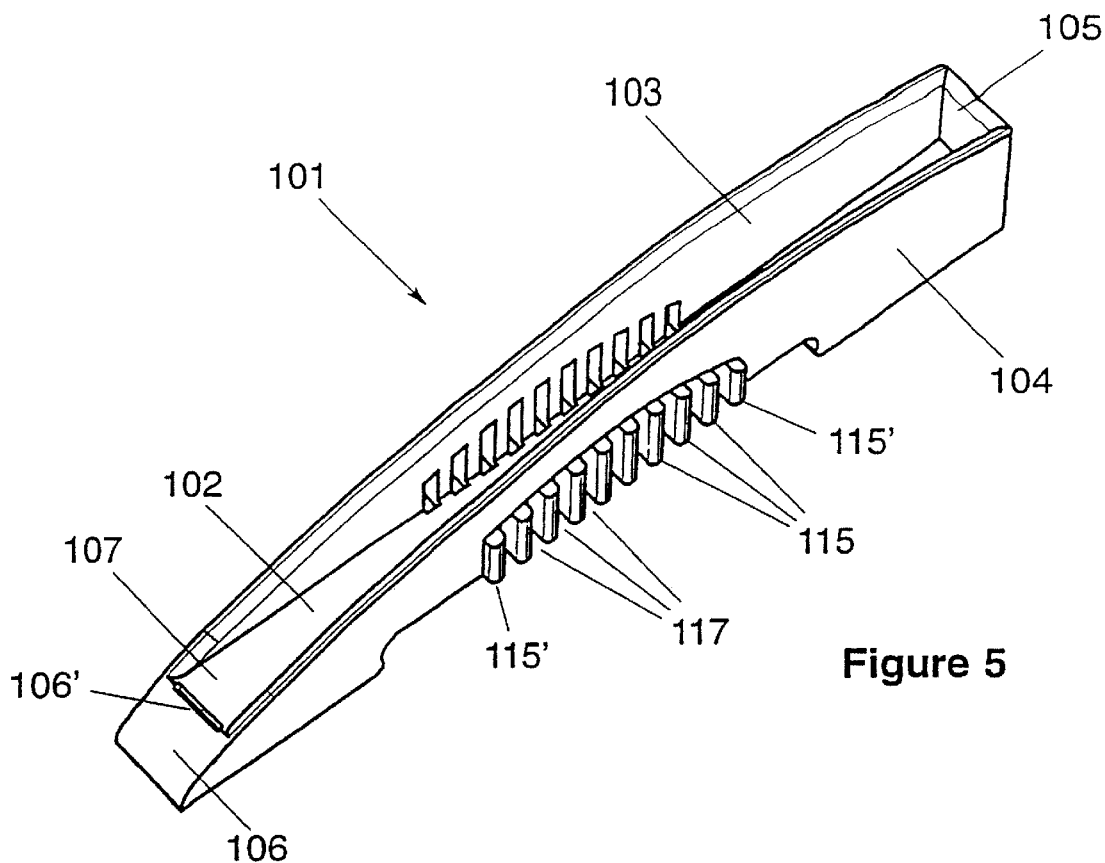
FIG. 5 shows a perspective view of an individual CD case holder according to a second embodiment of the invention.
Figure 6:
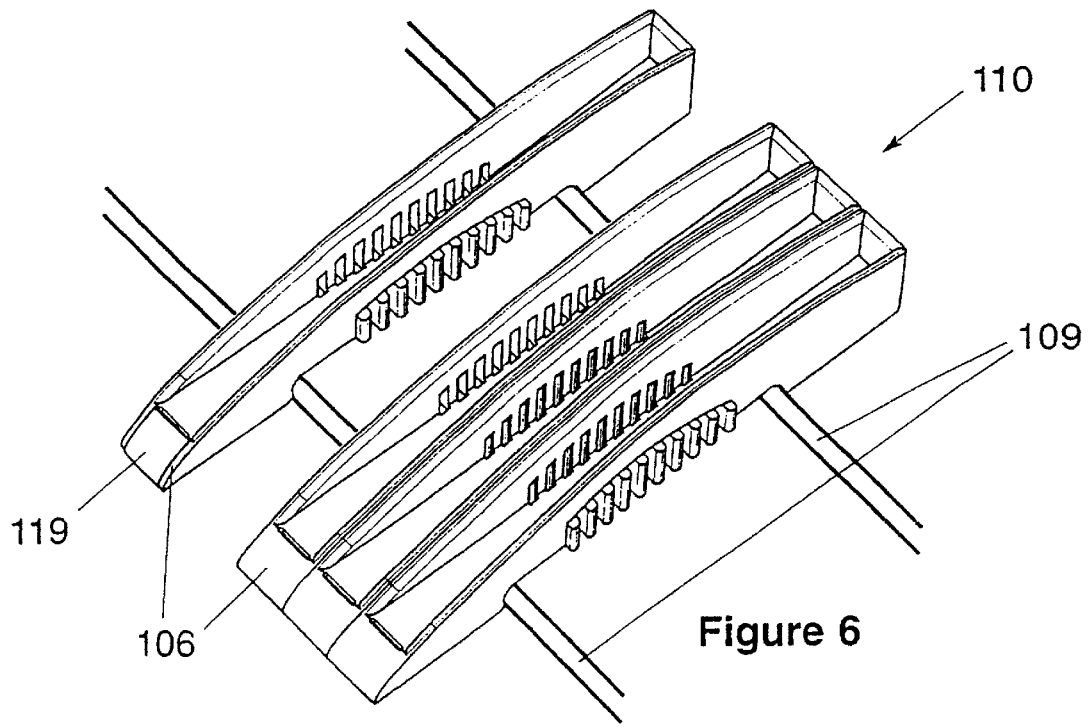
FIG. 6 shows a perspective view of a storage system including multiple CD case holders according to the second embodiment of the invention connected to form a CD storage rack mounted on rod track system.
Figure 7:
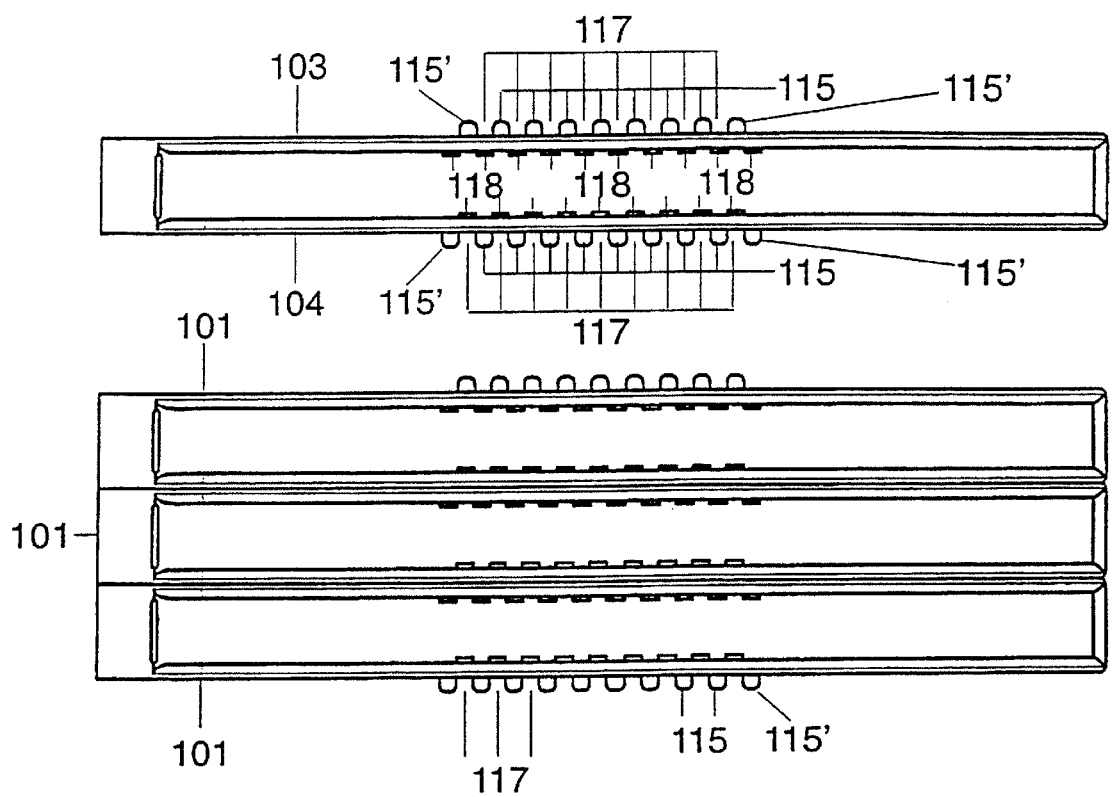
FIG. 7 shows a plan view of the storage system of FIG. 6.
Figure 8:
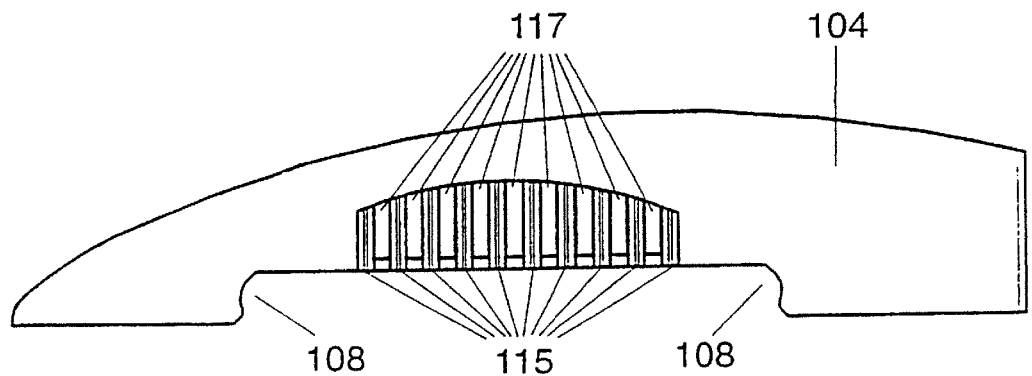
FIG. 8 shows a side elevation of the CD case holder of FIG. 5.
Figure 10:
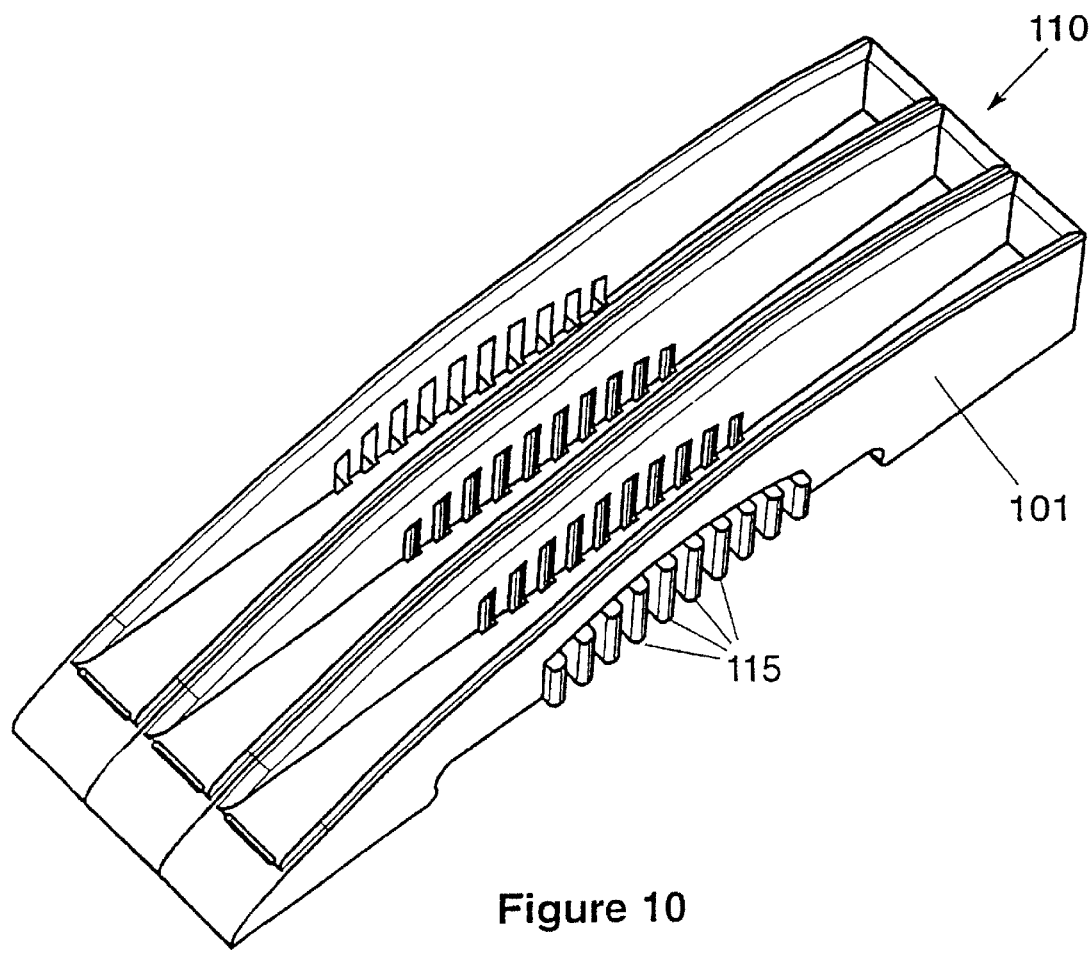
FIG. 10 shows an enlarged perspective view of the storage system of FIG. 6.
Figure 11:
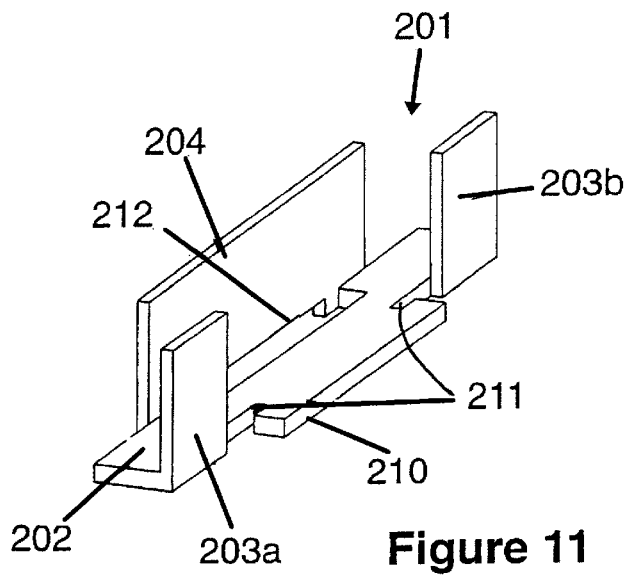
FIG. 11 shows a perspective view of an individual CD case holder according to a third embodiment of the invention.

FIGS. 5 and 8 illustrate an individual CD holder 101 according to a second embodiment of the invention and FIGS. 6, 7 and 10 show how the individual holders 101 are connected together to form a storage system 110. The individual holders 101 comprise a floor or base 102, a first side wall 103, a second side wall 104 and an end wall 105. A case 11 may be slid in and out through the open front 107.

The first side 103 and the second side 104 of the holder 101 have a plurality of interengaging projecting portions 115 extending outwardly therefrom. The projecting portions are separated by a series of recesses 117 between the individual projecting portions 115.

The projecting portions 115 of a first holder 101 can be slotted into the recesses 117 between the projecting portions on a second, adjacent holder 101. The projecting portions 115 are so spaced apart to allow the entry of a projecting portion from a second holder 101 to frictionally engage with the projecting portion of the first holder 101.

To allow the projecting portions 115, to fully extend past the projecting portions on a second holder 101, small slots 118 are provided in the base plate 102.

When two or more of the holders 101 are placed side by side the application of slight pressure forces the holders to join together forming a continuous rack 110 as seen in FIG. 6. Two holders 101 can be separated when required by means of exerting slight pressure to peel them apart, thereby disengaging the projecting portions from each other.

Alternatively one or more of the projecting portions 115 may be bulb shaped and will correspond with an opposite projecting portion on an adjacent holder which is similarly bulb shaped (not shown).

In use, the bulb shaped projecting portion will resiliently engage an opposite bulb shaped projecting portion on an adjacent holder to form a snap fit connection. Providing a bulb shaped projecting portion in this way will improve the locking effect between adjacent holders 101.

It is preferable for the individual units to be firmly connected. Shaping the projecting portions into a bulb shape will increase the rigidity of the connection. However as the individual holders 101 will be separated from each other from time to time, the connection should not be so tight as to cause difficulty in separating the holders 101 when required. Therefore only the outermost projecting portions 115' would normally be bulb shaped in order to reach a balance between a firm connection between the holders 101, and ease of separating the adjacent holders 101 when required.

Figure 9:
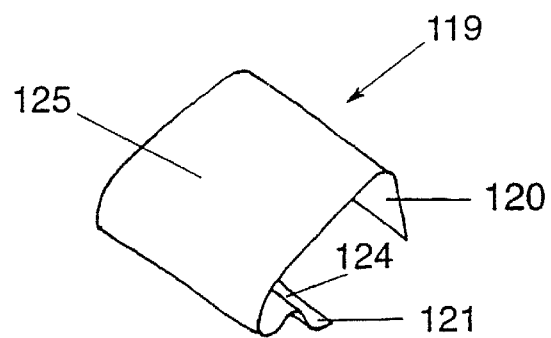
FIG. 9 shows an identification tag or clip which may be releasably fixed to the CD case holder of FIG. 5.

Labels or clips 119 can be attached to the front face 106 below the base plate 102 to label the contents of the holder 101. The front face 106 may be provided with a laterally extending slot 106' for this purpose, as seen in FIG. 5. For example the clips may designate the first letter of the CD contained in the holder. An example clip is shown in FIG. 9. Each clip 119 has a front portion 125, an upper 120 and lower flange 121. The angle between the upper flange 120 and the front portion 125 is normally less than 90 degrees, but preferably about 50 degrees. The flange and front portion are adapted to fit around the front face 106 of the holder. The angle between the front portion 125 and the lower flange extends at an angle less than 90 degrees but preferably around 70 degrees. The lower flange 121 has a groove 124 adapted to engage with the lower edge of the front face 106. The clip can be resiliently snapped into position by placing the upper flange 120 through the slot 106' at the top of the front face 106 and pressing the lower flange 121 over the lower edge of the front face 106, so that the groove 124 in the lower flange 121 positively engages the lower edge and holds the clip 119 in place.

Alternatively labels may be secured to the front faces 106 of the holders 101 by other means such as Velcro (RTM) or self adhesive formulation.

The downwardly extending walls 103 and 104 each have a curved portion 108 shaped so the individual holders 101 can be mounted on two lightweight metal rod tracks 109, whose ends are held in a support unit (not shown) provided at each end of the rods 109.

Instead of using rods 109, the system 110 may be placed on any flat shelf or desktop as a free standing unit. For this reason the bottom edges of the side walls 103, 104, rear wall 105 and front wall 106 all lie in a common horizontal plane.

Figure 12:
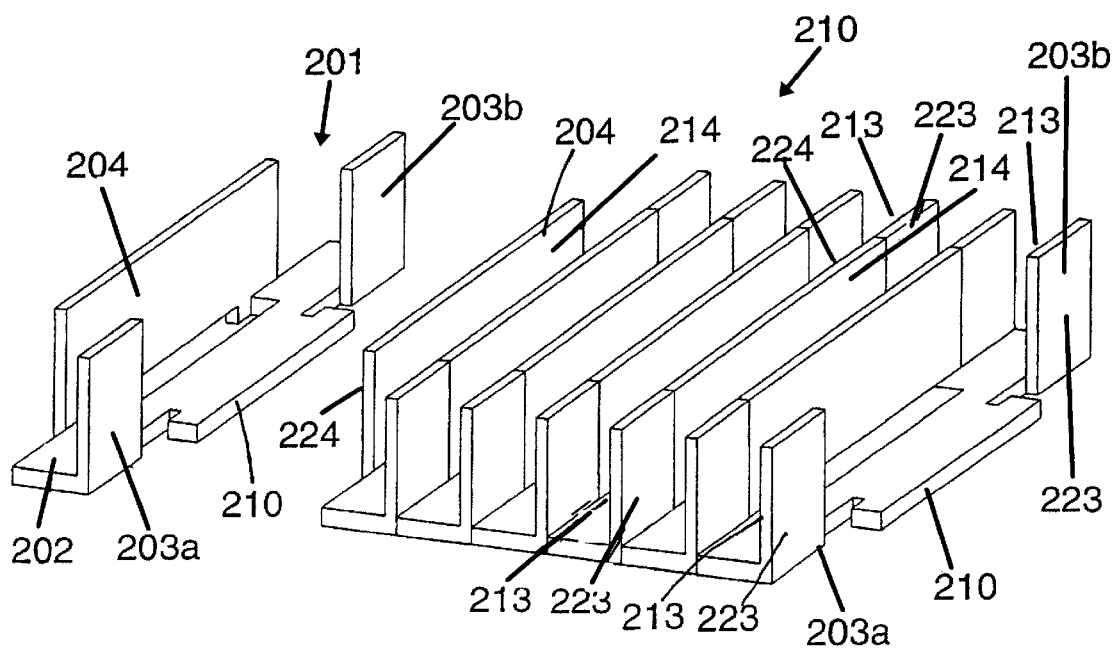
FIG. 12 shows a perspective view of a storage system including multiple CD case holders according to the second embodiment of the invention connected to form a CD storage rack which may be placed on a flat supporting surface.
Figure 13:
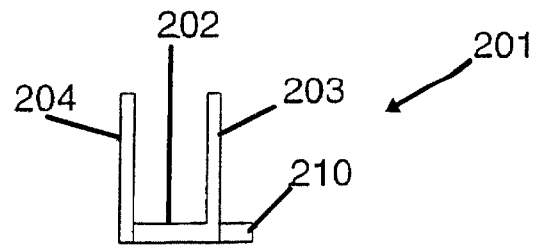
FIG. 13 shows a front elevation of the CD case holder of FIG. 11.
Figure 14:
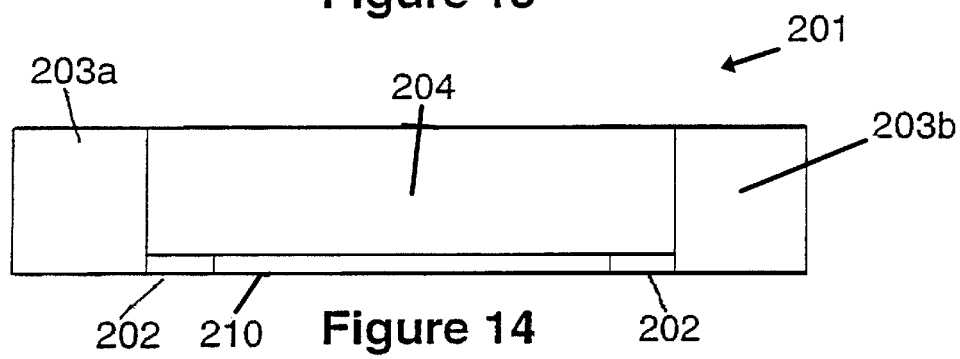
FIG. 14 shows a side elevation of the CD case holder of FIG. 11.
Figure 15:
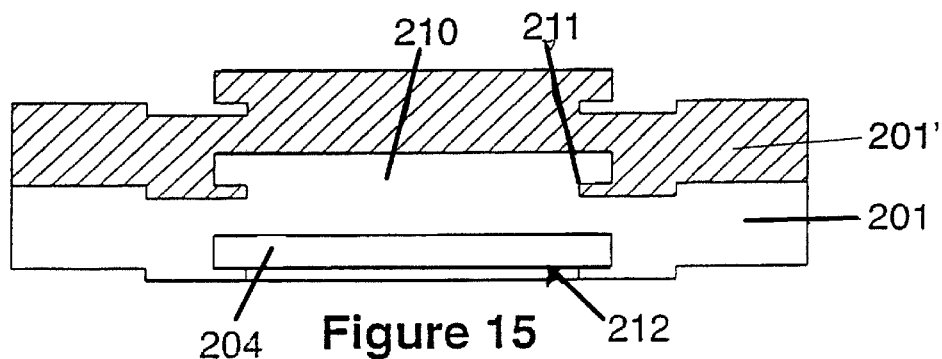
FIG. 15 shows a plan view from below of the CD case holder of FIG. 11.
Figure 16:
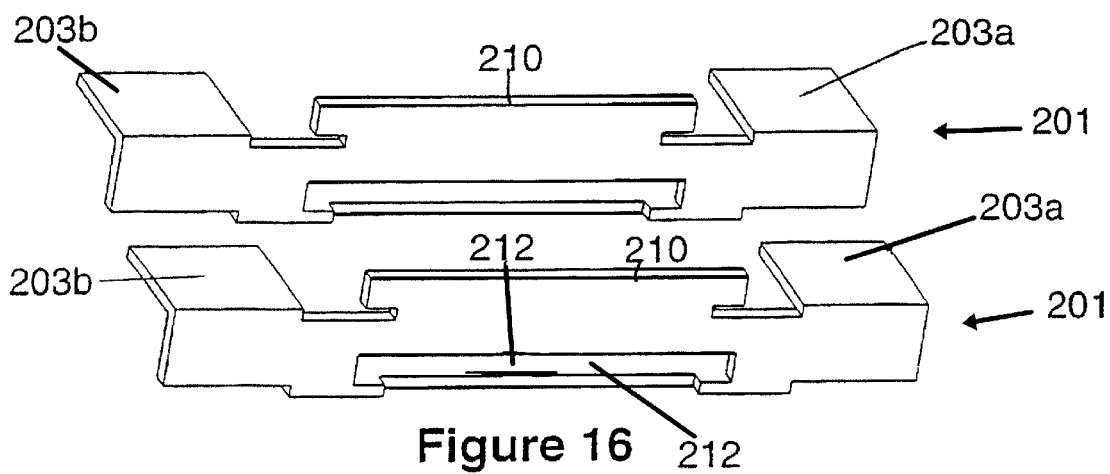
FIG. 16 shows a perspective view of two CD case holders according to FIG. 11 from below, showing the method of interconnection.

FIGS. 11, 13, 14 and 15 illustrate an individual CD holder 201 according to a third embodiment of the invention and FIGS. 12 and 16 show how the individual holders 201 are connected together to form a storage system 210. The individual holders 201 comprise a floor or base 202, a first side wall 203 which is in two parts, a front side wall 203*a* and a rear side wall 203*b*, and a second side wall 204.

The base 202 has a projecting lug 210 on its first side adjacent to the first wall 203. The lug 210 is coplanar with the remainder of the base. The lug 210 has a narrow waist portion 211. On the second side of the base 202 adjacent to the second wall 204 is a recess or cut-out 212, whose shape corresponds to that of the lug 210, such that the lug 210 can engage with the recess 212 of an adjacent holder 201'in a jig-saw puzzle manner, as is illustrated in the view from beneath the two holders 201, 201'in FIG. 15.

The front and rear side walls 203*a*, 203*b* are discontinuous and have a gap between them, so that the first side wall 203 can engage with the second side wall 204 of an adjacent holder when the lug 210 and cut-out 212 are mutually engaged, such that the inner 213 and outer 223 faces of the first side wall 203 are coplanar with the outer 224 and inner 214 faces respectively of the second side wall 204 of the adjacent holder, as can be seen in FIG. 12. In the illustrated embodiment the second side wall 204 has the same length as the gap in the first side wall 203, but in practice the length of the second side wall 204 may be less than that of the gap without affecting the functioning of the holders.

Two adjacent connected holders 201 may be separated by lifting one holder relative to the other and then separating the holders horizontally. Connection of the holders 201 takes place by reversing this process.

The holders 201 may be readily manufactured by an injection molding or other molding process.

Thus the invention allows for the construction of a continuous CD rack in any sequence and to any size with the ability for any two individual holders to be separated at any point in the sequence permitting the insertion of additions to the collection at any point. The modular nature of the system and the provision of individual holders in various colors provides the ability to color code individual CDs in categories within the collection while retaining alphabetical sequencing. The constructed rack is mountable on any flat shelf or desktop or on to a metal rod track system for which connection points are incorporated into the base of the holders.

Although the invention has been described in relation to CD cases, it is to be understood that the storage system of the invention can be used to store any rectilinear or cuboid cases, such as cases for CD-ROMs, DVD discs, optical discs, data discs, computer media discs and tapes, mini discs, cassette tapes or other data media. In particular the claims should be interpreted as referring to a storage apparatus and holders for the vertical storage of cases for any data disc or tape or media.

These and other modifications and improvements can be incorporated without departing from the scope of the invention.

What is claimed is:

1. A storage apparatus for the vertical storage of data media cases comprising a plurality of box-like holders, each holder comprising a base, which in use is substantially horizontal, and first and second opposing side walls, which in use are substantially vertical, the side walls each having an inner face and an outer face and being adapted to hold a data media case in a vertical position in a clearance fit between the respective inner faces of the first and second opposing side walls;

wherein each holder is provided with male and female fastening means adjacent to the first and second side walls respectively of the holder, the male and female fastening means being adapted to permit the releasable engagement of the male fastening means of one holder with the female fastening means of an adjacent holder, the releaseable engagement being in a direction normal to the base;

wherein the male fastening means comprises a horizontally extending lug provided on the base adjacent to the first side wall and the female fastening means comprises a corresponding cut-out provided on the base adjacent to the second side wall; and wherein the first side wall is discontinuous and is adapted to engage with the second side wall of an adjacent holder when the male and female fastening means are mutually engaged, such that the inner and outer faces of the first side wall are coplanar with the outer and inner faces respectively of the second side wall of the adjacent holder.

2. A holder for use in a storage apparatus, comprising a base, which in use is substantially horizontal, and first and second opposing side walls, which in use are substantially vertical, the side walls each having an inner face and an outer face and being adapted to hold a data media case in a vertical position in a clearance fit between the respective inner faces of the first and second opposing side walls;

wherein the holder is provided with male and female fastening means adjacent to the first and second side walls respectively, adapted to permit the releasable engagement of the male fastening means of one holder with the female fastening means of an adjacent identical holder, the releasable engagement being in a direction normal to the base;

wherein the male fastening means comprises a horizontally extending lug provided on the base adjacent to the first side wall and the female fastening means comprises a corresponding cut-out provided on the base adjacent to the second side wall; and wherein the first side wall is discontinuous and is adapted to engage with the second side wall of an identical adjacent holder when the male and female fastening means are mutually engaged, such that the inner and outer faces of the first side wall are coplanar with the outer and inner faces respectively of the second side wall of the adjacent holder.

* * * * *